United States Patent
Sawa

(10) Patent No.: US 8,300,707 B2
(45) Date of Patent: Oct. 30, 2012

(54) BLOCK NOISE REDUCTION DEVICE AND IMAGE DISPLAY DEVICE

(75) Inventor: Kazuki Sawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1422 days.

(21) Appl. No.: 10/571,645

(22) PCT Filed: Oct. 14, 2005

(86) PCT No.: PCT/JP2005/018934
§ 371 (c)(1), (2), (4) Date: Mar. 14, 2006

(87) PCT Pub. No.: WO2006/041152
PCT Pub. Date: Apr. 20, 2006

(65) Prior Publication Data
US 2008/0252789 A1    Oct. 16, 2008

(30) Foreign Application Priority Data
Oct. 15, 2004  (JP) ................. 2004-301174

(51) Int. Cl.
*H04N 7/12* (2006.01)
*H04N 11/02* (2006.01)
*H04N 11/04* (2006.01)

(52) U.S. Cl. ............... 375/240.27; 348/607

(58) Field of Classification Search ........ 348/607; 375/240.27
See application file for complete search history.

(56) References Cited

U.S. PATENT DOCUMENTS 5,268,760 A * 12/1993 Suyama ................ 348/624
5,508,743 A    4/1996 Iizuka
5,666,162 A    9/1997 Iizuka
5,867,228 A * 2/1999 Miki et al. ............ 348/624
6,061,100 A * 5/2000 Ward et al. ............ 348/607

(Continued)

FOREIGN PATENT DOCUMENTS

JP    61-121589    6/1986

(Continued)

OTHER PUBLICATIONS

Japanese Search Report for PCT/JP2005/018934, dated Dec. 20, 2005.

(Continued)

*Primary Examiner* — David Czekaj
*Assistant Examiner* — Chikaodili E Anyikire
(74) *Attorney, Agent, or Firm* — RatnerPrestia

(57) ABSTRACT

A frame correlation determination part is for determining a level of correlation of decoded image signals between frames. A flat region detection part is for detecting an image region in which a difference in brightness between neighboring pixels is small as a flat region from the decoded image signals. A high-frequency region detection part is for detecting an image region including a high spatial frequency component as a high-frequency region from the decoded image signal. A smoothing processing part is for performing smoothing processing to the decoded image signal corresponding to a predetermined region. A processing region setting part is for setting an image region in which the smoothing processing part is to perform smoothing processing to the decoded image signal are included. The processing region setting part sets at least a region in frames in which a correlation between frames is low and which is a flat region and not a high frequency region in the decoded image signals, as a processing region.

4 Claims, 9 Drawing Sheets

U.S. PATENT DOCUMENTS

| | | |
|---|---|---|
| 6,999,634 B2 * | 2/2006 | Hong .................... 382/275 |
| 7,245,783 B2 * | 7/2007 | Fielding ................ 382/275 |
| 2002/0080882 A1 * | 6/2002 | Kitagawa ............ 375/240.29 |
| 2007/0058726 A1 * | 3/2007 | Ha et al. ............. 375/240.24 |

FOREIGN PATENT DOCUMENTS

| | | |
|---|---|---|
| JP | 64-055987 | 3/1989 |
| JP | 05056306 A | 3/1993 |
| JP | 5161130 A | 6/1993 |
| JP | 08-084342 | 3/1996 |
| JP | 8-84342 | 3/1996 |
| JP | 08084342 A | 3/1996 |
| JP | 09-130794 | 5/1997 |
| JP | 10-191335 | 7/1998 |
| JP | 2001-224031 | 8/2001 |
| JP | 2002-204457 | 7/2002 |
| JP | 2002-232890 | 8/2002 |
| JP | 2003-219419 | 7/2003 |

OTHER PUBLICATIONS

English translation of Form PCT/ISA/210.

Japanese Office Action for Application No. 2004-301174, Nov. 24, 2010, Panasonic Corporation.

* cited by examiner

| $\frac{1}{128}$ | $\frac{-2}{128}$ | $\frac{1}{128}$ |
|---|---|---|
| $\frac{-2}{128}$ | $\frac{4}{128}$ | $\frac{-2}{128}$ |
| $\frac{1}{128}$ | $\frac{-2}{128}$ | $\frac{1}{128}$ |

FIG. 7A

| $\frac{1}{256}$ | $\frac{4}{256}$ | $\frac{6}{256}$ | $\frac{4}{256}$ | $\frac{1}{256}$ |
|---|---|---|---|---|
| $\frac{4}{256}$ | $\frac{16}{256}$ | $\frac{24}{256}$ | $\frac{16}{256}$ | $\frac{4}{256}$ |
| $\frac{6}{256}$ | $\frac{24}{256}$ | $\frac{36}{256}$ | $\frac{24}{256}$ | $\frac{6}{256}$ |
| $\frac{4}{256}$ | $\frac{16}{256}$ | $\frac{24}{256}$ | $\frac{16}{256}$ | $\frac{4}{256}$ |
| $\frac{1}{256}$ | $\frac{4}{256}$ | $\frac{6}{256}$ | $\frac{4}{256}$ | $\frac{1}{256}$ |

FIG. 7B

| $\frac{1}{55}$ | $\frac{1}{55}$ | $\frac{1}{55}$ | $\frac{1}{55}$ | $\frac{1}{55}$ | $\frac{1}{55}$ | $\frac{1}{55}$ | $\frac{1}{55}$ | $\frac{1}{55}$ |
|---|---|---|---|---|---|---|---|---|
| $\frac{1}{55}$ | $\frac{1}{55}$ | $\frac{1}{55}$ | $\frac{2}{55}$ | $\frac{2}{55}$ | $\frac{2}{55}$ | $\frac{1}{55}$ | $\frac{1}{55}$ | $\frac{1}{55}$ |
| $\frac{1}{55}$ | $\frac{1}{55}$ | $\frac{1}{55}$ | $\frac{2}{55}$ | $\frac{3}{55}$ | $\frac{2}{55}$ | $\frac{1}{55}$ | $\frac{1}{55}$ | $\frac{1}{55}$ |
| $\frac{1}{55}$ | $\frac{1}{55}$ | $\frac{1}{55}$ | $\frac{2}{55}$ | $\frac{2}{55}$ | $\frac{2}{55}$ | $\frac{1}{55}$ | $\frac{1}{55}$ | $\frac{1}{55}$ |
| $\frac{1}{55}$ | $\frac{1}{55}$ | $\frac{1}{55}$ | $\frac{1}{55}$ | $\frac{1}{55}$ | $\frac{1}{55}$ | $\frac{1}{55}$ | $\frac{1}{55}$ | $\frac{1}{55}$ |

US 8,300,707 B2

BLOCK NOISE REDUCTION DEVICE AND IMAGE DISPLAY DEVICE

This application is a U.S. national phase application of PCT International application PCT/JP2005/018934.

TECHNICAL FIELD

The present invention relates to a block noise reduction device for removing block noise from a decoded image signal obtained by decoding a compressed and coded image signal, and an image display device using the block noise reduction device.

BACKGROUND ART

Recently, as a highly efficient method for compressing and coding images, MPEG (Moving Picture Experts Group) system has been widely used and MPEGs 1, 2 and 4 have been internationally standardized. MPEG system removes redundancy in the spatial direction and the temporal direction from an image signal and compresses and codes the image signal. At this time, when the compression rate is small, the image quality of the decoded image signal hardly deteriorates. However, when the compression rate becomes higher, coding noises may be noticeable and the image quality may be deteriorated.

Typical examples of the coding noise in MPEG system include block noise. The block noise is lattice noise occurring when continuity of image signals between neighboring blocks is impaired when the image signals are compressed and coded in an 8×8 pixel block-shaped region and these compressed and coded image signals are decoded. Thus, since the block noise has regularity, it is perceived more easily as compared with random noise. Particularly, the block noise tends to be noticeable in a flat image region with a low spatial frequency and with little change in brightness. The block noise is known to be recognized clearly in a region which is relatively flat and includes gradation, for example, an image of sky, human skin, or the like.

As a block noise reduction method, Japanese Patent Unexamined Publication No. H10-191335 proposes a method of firstly detecting a boundary between blocks and then performing smoothing processing such as low-pass filter processing to image data in the boundary between blocks.

However, in the above-mentioned block noise reduction method, it is difficult to reliably distinguish the boundary between blocks from a mere contour portion of image. When smoothing processing is performed to a counter potion that is mistaken as the boundary between blocks, the resolution is deteriorated so as to cause the counter portion of the image to appear blurred.

SUMMARY OF THE INVENTION

A block noise reduction device of the present invention is a block noise reduction device for reducing block noise from a decoded image signal obtained by decoding a compressed and coded image signal, including a frame correlation determination part for determining a level of correlation of the decoded image signals between frames; a flat region detection part for detecting an image region in which a difference in brightness between neighboring pixels is small as a flat region from the decoded image signal; a high-frequency region detection part for detecting an image region including a high spatial frequency component as a high-frequency region from the decoded image signal; a smoothing processing part for performing smoothing processing to the decoded image signal corresponding to a predetermined region; and a processing region setting part for specifying an image region in which the smoothing processing part is to perform smoothing processing to the decoded image signal. The processing region setting part sets at least a region in frames in which a correlation between frames is low and which is a flat region and not a high frequency region in the decoded image signals, as a processing region.

Furthermore, it is preferable that the block noise reduction device of the present invention includes a moving picture region detection part for detecting a moving picture region from the decoded image signal, and the processing region setting part sets a region in frames in which a correlation between frames is low and which is a flat region and not a high frequency region in the decoded image signals, or a region which is a moving picture region, a flat region of the decoded image signal and not a high frequency region.

BRIEF DESCRIPTION OF THE DRAWINGS

FIG. 7A is a chart showing a first coefficient matrix for performing weak two-dimensional low-pass filter processing in coefficient memory 163 of the smoothing processing part of the block noise reduction device in accordance with the second exemplary embodiment of the present invention.

FIG. 7B is a chart showing a second coefficient matrix for performing strong two-dimensional low-pass filter processing in coefficient memory 163 of the smoothing processing part of the block noise reduction device in accordance with the second exemplary embodiment of the present invention.

Figure 1:
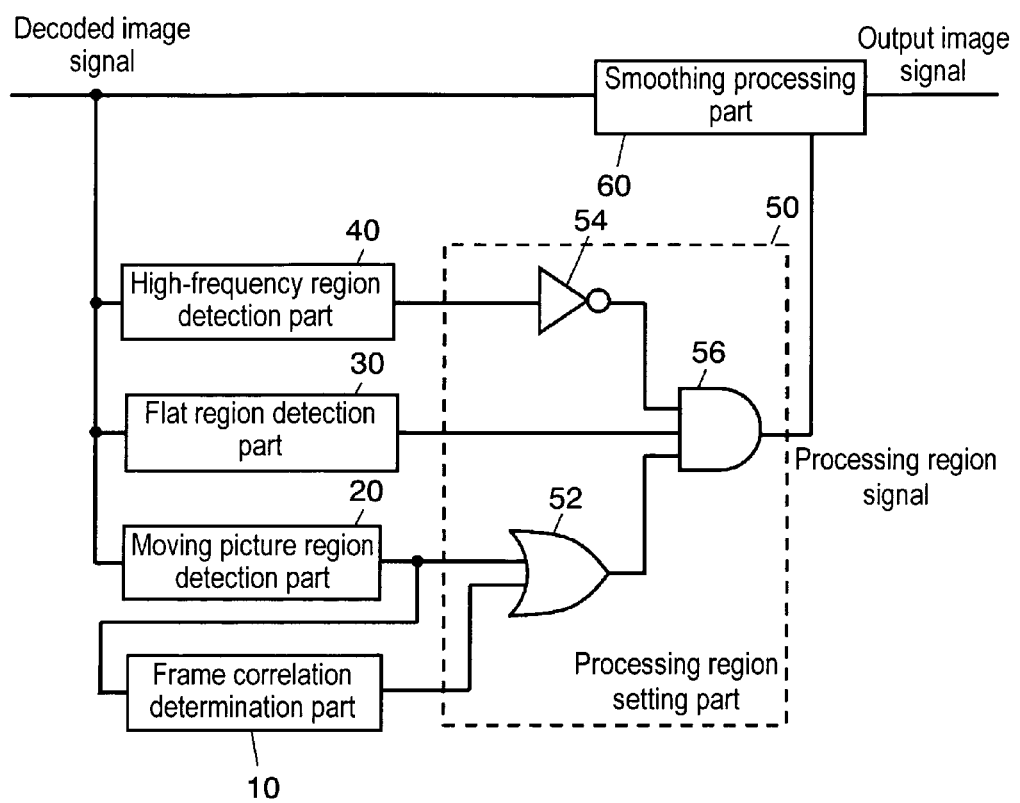
FIG. 1 is a circuit block diagram showing a block noise reduction device in accordance with a first exemplary embodiment of the present invention.

REFERENCE MARKS IN THE DRAWINGS 10, 110 frame correlation determination part
12 cumulative addition circuit
14, 28, 36, 45 comparator
16 hold circuit
20 moving picture region detection part
22, 69 delay circuit
24, 34 difference circuit
26, 35, 44 absolute value circuit
30 flat region detection part
31, 41, 61, 2651 line memory
32 maximum value detection circuit
33 minimum value detection circuit
40 high-frequency region detection part
42, 63, 163, 2653 coefficient memory
43, 62, 2652 product-sum operation circuit
50 processing region setting part
52 OR circuit
54 inverter
56 AND circuit
60, 160, 260 smoothing processing part
64 selector
265 multiplier calculation circuit
266, 267 multiplication circuit
268 addition circuit
2654 subtraction circuit

DETAILED DESCRIPTION OF THE PREFERRED EMBODIMENTS

First Exemplary Embodiment

FIG. 1 is a circuit block diagram showing a block noise reduction device in accordance with a first exemplary embodiment of the present invention, and includes frame correlation determination part 10, moving picture region detection part 20, flat region detection part 30, high-frequency region detection part 40, processing region setting part 50 and smoothing processing part 60.

Frame correlation determination part 10 determines the level of correlation between frames in the entire screen based on the difference between an input decoded image signal (hereinafter, abbreviated as "image signal") and an image signal of one preceding frame and outputs a frame correlation signal indicating that the correlation between frames is low. Moving picture region detection part 20 detects a moving picture region in which a change in the image signal level between frames is large based on the difference between an input image signal and an image signal of one preceding frame and outputs a moving picture region signal indicating the region. Flat region detection part 30 detects a picture region in which a difference in brightness, that is, a difference in the image signal level between neighboring pixels is small, and outputs a flat region signal indicating the region. High-frequency region detection part 40 detects a region of an image including a high spatial frequency component as a high frequency region and outputs a high frequency region signal indicating the region.

Processing region setting part 50 sets a region in which smoothing processing should be performed to an image signal, based on the frame correlation signal, the moving picture region signal, the flat region signal and the high frequency region signal, and outputs a processing region signal indicating the region. OR circuit 52 outputs a logical sum of the frame correlation signal and the moving picture region signal. Therefore, the output from OR circuit 52 indicates a signal showing that correlation between frames is low in the entire screen or a moving picture region. Inverter 54 outputs a logical NOT of the high frequency region signal. Therefore, the output from inverter 54 indicates an image region that does not have a high spatial frequency component. AND circuit 56 outputs a logical product of the output from OR circuit 52, the output from inverter 54 and the flat region signal from flat region detection part 30. Therefore, the output from AND circuit 56, that is, the processing region signal indicate:

(1) a region in frames in which a correlation between frames is low and which is a flat region and not a high frequency region, or
(2) a region which is a moving picture region, a flat region and not a high frequency region.

Smoothing processing part 60 performs smoothing processing such as low-pass filter processing to an image signal corresponding to an image region indicated by the processing region signal and outputs an image signal with reduced block noise. That is to say, in the regions corresponding to the above-mentioned (1) and (2), smoothing processing is performed to an image signal so as to suppress block noise. In the other regions, the smoothing processing is not performed.

According to the above-mentioned configuration, in the case where the correlation between frames becomes low, for example, in the case where an image signal changes in the entire screen, as in an image taken by a camera while the camera is being moved, smoothing processing to an image signal is performed in a region in which level difference in image signals between neighboring pixels is relatively small and which does not include a high spatial frequency component. Furthermore, even when the correlation between frames is relatively high, block noise partially occurring in a moving picture part can be also suppressed. Thus, the block noise reduction device in accordance with the first exemplary embodiment can efficiently suppress block noise in a noticeable region without impairing the resolution.

Figure 2:
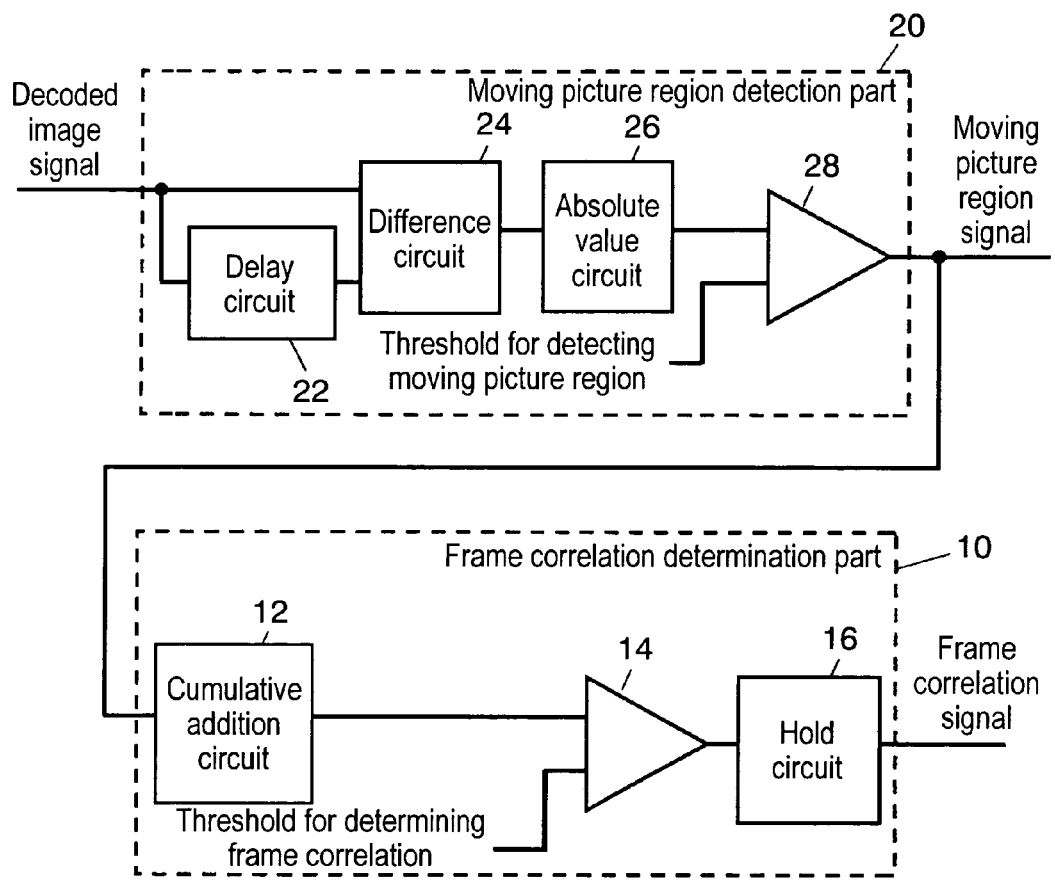
FIG. 2 is a circuit block diagram showing a frame correlation determination part and a moving picture region detection part of the block noise reduction device in accordance with the first exemplary embodiment of the present invention.

Hereinafter, each block is described in detail. FIG. 2 is a circuit block diagram showing frame correlation determination part 10 and moving picture region detection part 20 of the block noise reduction device in accordance with the first exemplary embodiment of the present invention.

Firstly, moving picture region detection part 20 is described. Delay circuit 22 delays an input image signal by one frame. Difference circuit 24 calculates the difference between an input image signal and an image signal of one preceding frame output from delay circuit 22. Absolute value circuit 26 calculates an absolute value of the difference. Comparator 28 compares the output from absolute value circuit 26 with a threshold for detecting a moving picture region, and outputs "0" as a moving picture region signal when the output from absolute value circuit 26 is less than the threshold for detecting the moving picture region and outputs "1" as a moving picture region signal when the output is not less than the threshold. Therefore, the moving picture region signal is "1" when the input image signal is a moving picture region and "0" when the input image signal is not a moving picture region.

Frame correlation determination part 10 includes cumulative addition circuit 12, comparator 14 and hold circuit 16. Cumulative addition circuit 12 calculates the total sum of pixels having moving picture region signal "1." Comparator 14 compares an output from cumulative addition circuit 12 with a threshold for determining the frame correlation, and outputs "0" when the output from cumulative addition circuit 12 is less than the threshold for determining the frame correlation and outputs "1" when the output is not less than the threshold. Consequently, in the frames in which the output from comparator 14 is "0," the correlation between the frames is high, and in the frames in which the output from comparator 14 is "1," the correlation between the frames is low. Therefore, in the frames in which the output from comparator 14 is "1," block noise is likely to occur. Then, once the output from comparator 14 becomes "1," hold circuit 16 holds the state of "1" during several frames and outputs the signal as a frame correlation signal. Note here that the frame correlation signal is constant during one frame.

When the output from cumulative addition circuit 12 becomes extremely large, that is, the correlation of image signals between frames becomes extremely low, for example, right after a screen changes or the moment a camera flashes, and the like, even if the following correlation between frames becomes high, block noise may occur in consecutive several frames. In order to cope with such a case, hold circuit 16 is provided. The first exemplary embodiment cope with block noise occurring in several frames by setting a holding period of hold circuit 16 to seven frames. Note here that a configuration, in which the larger the output from cumulative addition circuit 12 is, the longer the holding period is, may be employed.

Figure 3A:
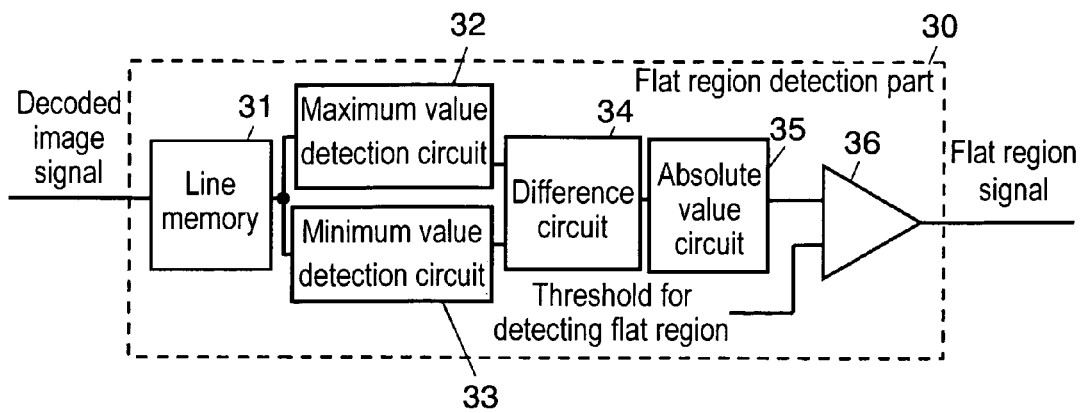
FIG. 3A is a circuit block diagram showing flat region detection part 30 of the block noise reduction device in accordance with the first exemplary embodiment of the present invention.
Figure 3B:
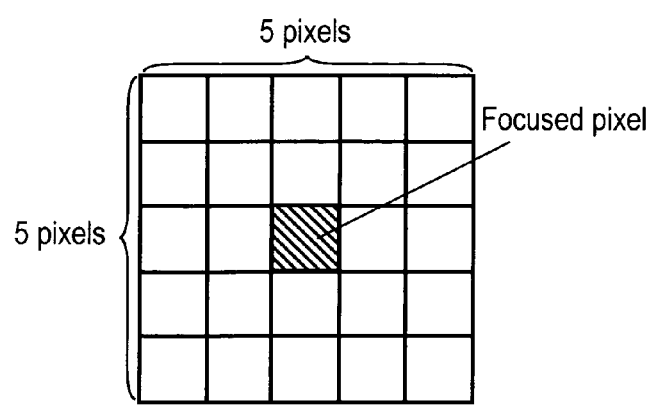
FIG. 3B is a view showing an example of a flat region detection matrix of the block noise reduction device in accordance with the first exemplary embodiment of the present invention.

FIG. 3A is a circuit block diagram showing flat region detection part 30 of the block noise reduction device in accordance with the first exemplary embodiment of the present invention. By using a flat region detection matrix including a focused pixel and composed of m×n pixels (m and n denote a positive integer), flat region detection part 30 detects a flat region in which a difference in the image signal level between neighboring pixels is small. FIG. 3B is a view showing an example a flat region detection matrix of the block noise reduction device in accordance with the first exemplary embodiment of the present invention. The first exemplary embodiment describes the detection of a flat region by using a 5×5 pixel matrix including a focused pixel at the center thereof. Line memory 31 accumulates at least four lines of image signals for extracting 25 pixels of image signals from the 5×5 pixel matrix. Maximum value detection circuit 32 detects a maximum value of 25 pixels of image signals in the 5×5 pixel matrix, and minimum value detection circuit 33 detects a minimum value of the image signals in the same matrix. Then, difference circuit 34 calculates the difference between the maximum value and the minimum value. Absolute value circuit 35 calculates the absolute value of the difference. Comparator 36 compares the output from absolute value circuit 35 with a threshold for detecting a flat region, determines that the focused pixel does not belong to the flat region and outputs a flat region signal "0" when the output from absolute value circuit 35 is not less than the threshold for detecting a flat region. Furthermore, when the output from absolute value circuit 35 is less than a flat region detection threshold, comparator 36 determines that the focused pixel belongs to the flat region and outputs a flat region signal "1." According to such a configuration, a flat region can be detected with a relatively simple circuit configuration. Then, the region in which the flat region signal becomes "1" is shown to be a region in which block noise is visually noticeable.

Figures 4A, 4B:
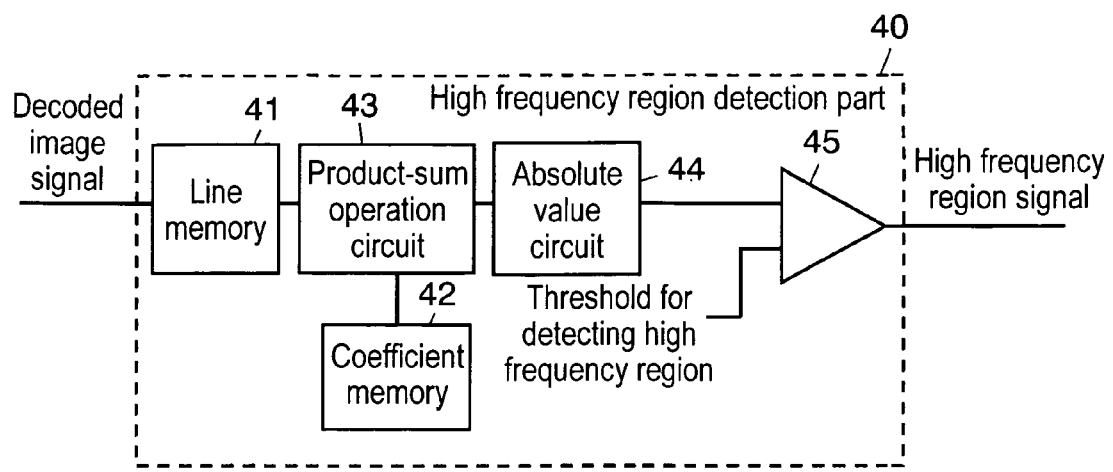
FIG. 4A is a circuit block diagram showing a high-frequency region detection part of the block noise reduction device in accordance with the first exemplary embodiment of the present invention.
FIG. 4B is a view showing a coefficient matrix of a two-dimensional high pass filter of the high-frequency region detection part of the block noise reduction device in accordance with the first exemplary embodiment of the present invention.

FIG. 4A is a circuit block diagram showing high-frequency region detection part 40 of the block noise reduction device in accordance with the first exemplary embodiment of the present invention. High-frequency region detection part 40 detects a high frequency region showing a region of an image containing a high spatial frequency component by using a high frequency region detection matrix including a focused pixel and composed of j×k pixels (j and k denotes a positive integer). The first exemplary embodiment describes a case where a high pass filter processing is performed by using a 3×3 pixel high frequency region detection matrix having a focused pixel at the center thereof. Line memory 41 accumulates at least two lines of image signals for extracting nine pixels of image signals from the 3×3 pixel matrix. Coefficient memory 42 is a memory storing a 3×3 pixel coefficient matrix of a two-dimensional high pass filter. FIG. 4B shows a coefficient matrix of a two-dimensional high pass filter of the block noise reduction device in accordance with the first exemplary embodiment of the present invention. Product-sum operation circuit 43 multiplies an image signal at each pixel position of the 3×3 pixel matrix by a coefficient of the high pass filter, respectively, further calculates the total sum thereof and outputs it as an image signal after a high pass filter processing is performed of the focused pixel. Absolute value circuit 44 converts the image signal after high pass processing is performed into the absolute value. Comparator 45 compares the output from absolute value circuit 44 with a threshold for detecting a high frequency region and then outputs "0" as a high frequency region signal when the output from absolute value circuit 44 is less than the threshold and outputs "1" as a high frequency region signal when the output is not less than the threshold, respectively. Therefore, a region in which the high frequency region signal becomes "1" shows a region to which smoothing processing for preventing the deterioration of the resolution is not performed. In order that a high frequency region will not be output by detecting block noise itself, a coefficient of high pass filter is set so as to decrease the sensitivity of the high pass filter in the horizontal and vertical directions.

Note here that the above-mentioned threshold for detecting a moving picture region, threshold for determining a frame correlation, threshold for detecting a flat region and threshold for detecting a high frequency region are determined based on the evaluation of the image on an image display device using the block noise reduction device in accordance with the exemplary embodiment.

Processing region setting part 50 outputs a processing region signal indicating an image region in which smoothing processing should be performed to an image signal. The image region to which smoothing processing should be performed is a region in which the frame correlation signal is "1" or the moving picture region signal is "1," the flat region signal is "1" and the high frequency region signal is "0." Therefore, in order to satisfy these conditions, processing region setting part 50 is configured by using OR circuit 52, inverter 54 and AND circuit 56.

Figures 5A, 5B:
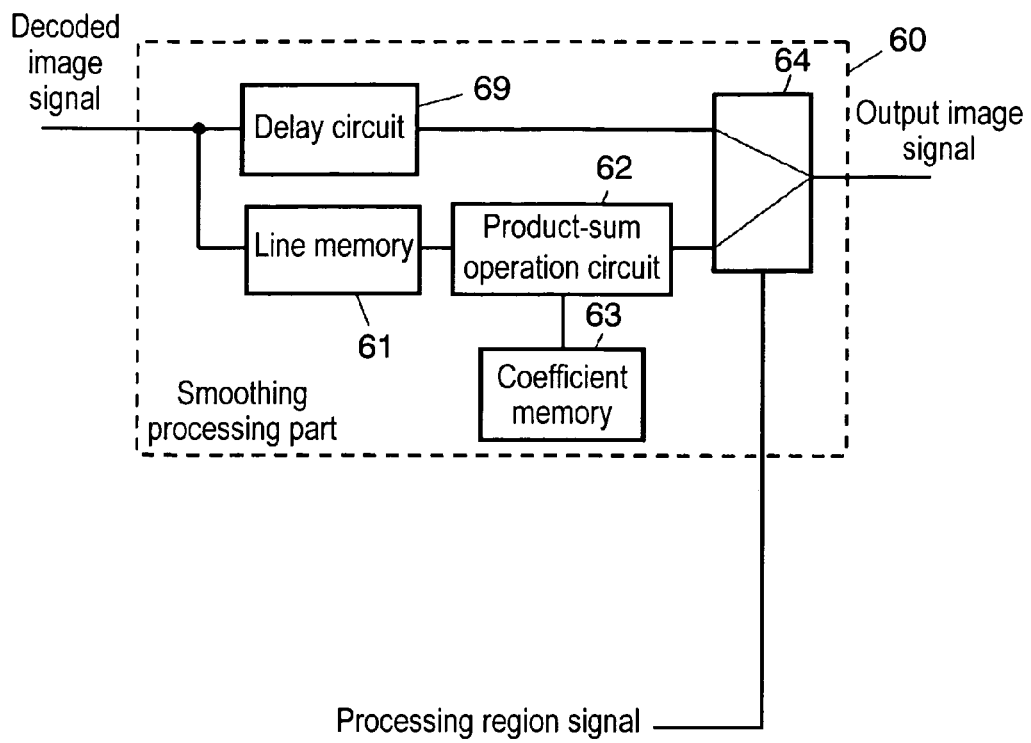
FIG. 5A is a circuit block diagram showing a smoothing processing part of the block noise reduction device in accordance with the first exemplary embodiment of the present invention.
FIG. 5B is a view showing a coefficient matrix of a two-dimensional low pass filter of the smoothing processing part of the block noise reduction device in accordance with the first exemplary embodiment of the present invention.

FIG. 5A is a circuit block diagram showing smoothing processing part 60 of the block noise reduction device in accordance with the first exemplary embodiment of the present invention. Smoothing processing part 60 removes a high frequency component such as block noise and the like contained in an image signal by performing smoothing processing such as low-pass filter processing to the image signal by the use of a smoothing processing matrix including a focused pixel and composed of q×u pixels (q and u denotes a positive integer). The first exemplary embodiment describes a case where low-pass filter processing is performed by using a 5×5 pixel matrix having a focused pixel at the center thereof. Line memory 61 accumulates at least four lines of image signals for extracting an image signal from the 5×5 pixel matrix. Coefficient memory 63 is a memory storing a coefficient of a two-dimensional low-pass filter. FIG. 5B shows an example of a coefficient matrix of a two-dimensional low pass filter of the block noise reduction device in accordance with the first exemplary embodiment of the present invention. Product-sum operation circuit 62 multiplies an image signal at each pixel position of the 5×5 pixel matrix by a coefficient of the two-dimensional low-pass filter, respectively, further calculates the total sum thereof, and outputs it as an image signal after a high pass filter processing is performed of the focused pixel. Selector 64 selects either an image signal to which smoothing processing is not performed or an image signal to which smoothing processing was performed based on the processing region signal. Note here that delay circuit 69 is provided in order to compensate the delay time in accordance with the smoothing processing and adjust the phases of the two image signals.

According to the above-mentioned configuration, the smoothing processing to image signals is performed in a region in which correlation between frames in the entire screen is low and which is a flat region and not a high frequency region, or a region which is a moving picture region, a flat region and not a high frequency region. In this way, with respect to the image signal obtained by decoding the compressed and coded image signal, the block noise in a noticeable region can be efficiently suppressed without impairing the resolution of the image.

In the description of the first exemplary embodiment, moving picture region detection part 20 calculates the difference of the image signal between frames in the entire pixels. However, in order to reduce the scale of the circuit, pixels in which the difference is calculated may be thinned out. For example, one pixel is selected from 2×2 pixels and then the difference of the pixels may be calculated. Thus, by thinning the pixels in which the difference is calculated in a range that does not largely affect the detection precision, the size of the circuit can be reduced.

Furthermore, flat region detection part 30 in the first exemplary embodiment uses a 5×5 pixel matrix for smoothing processing. However, other detection methods may be used as long as it is possible to detect a region in which the level difference between neighboring pixels is small.

Furthermore, in high-frequency region detection part 40 of the first exemplary embodiment, a high frequency region signal is obtained by making the output from absolute value circuit 44 be a binary code by the use of comparator 45. However, a circuit for enlarging a high frequency region may be provided so that the high-frequency region is not subjected to smoothing processing reliably. A configuration may be employed in which, for example, a region enlargement circuit is provided behind absolute value circuit 44 and the region enlargement circuit performs equalizing processing to the output from absolute value circuit 44, so that a detection region of absolute value circuit 44 is enlarged.

Furthermore, high-frequency region detection part 40 of the first exemplary embodiment uses a two-dimensional high pass filter shown in FIG. 4 as a high-frequency detection filter having a low sensitivity to detection of a high-frequency component in the horizontal and vertical directions. However, a high pass filter is not limited to this configuration and any high pass filters can be used as long as they have a low sensitivity in the horizontal and vertical directions.

Furthermore, flat region detection part 30, high-frequency region detection part 40 and smoothing processing part 60 in the first exemplary embodiment have line memories 31, 41 and 61, independently. However, a configuration in which such line memories are shared may be employed.

Furthermore, even when the decoded image signal is interlace, it is desirable that delay circuit 22 delays input image by one frame, that is, by two fields. With this configuration, frame correlation determination part 10 can determine the correlation between odd fields and between even fields.

Although the description is omitted in the above, in accordance with the signal processing using a line memory or a frame memory, a phase difference may occur between the image signals of the circuit blocks. In such a case, by using a delay circuit and the like, the phase is appropriately adjusted.

As mentioned above, according to the block noise reduction device in the first exemplary embodiment, smoothing processing is performed with respect to a frame in which block noise is likely to occur or a moving picture region, and a region in which block noise is noticeable and which dose not include a high spatial frequency component. Therefore, block noises can be reduced without impairing the resolution.

Second Exemplary Embodiment

A block noise reduction device in a second exemplary embodiment of the present invention is the same as that in the first exemplary embodiment in that smoothing processing to image signals is performed in a region in frames in which a correlation between frames is low and which is a flat region and not a high frequency region in the image signals, or a region which is a moving picture region, is a flat region and is not a high frequency region. The block noise reduction device of the second exemplary embodiment is different from that of the first exemplary embodiment in that a smoothing degree of a smoothing circuit is controlled in accordance with the level of the correlation between frames.

Figure 6:
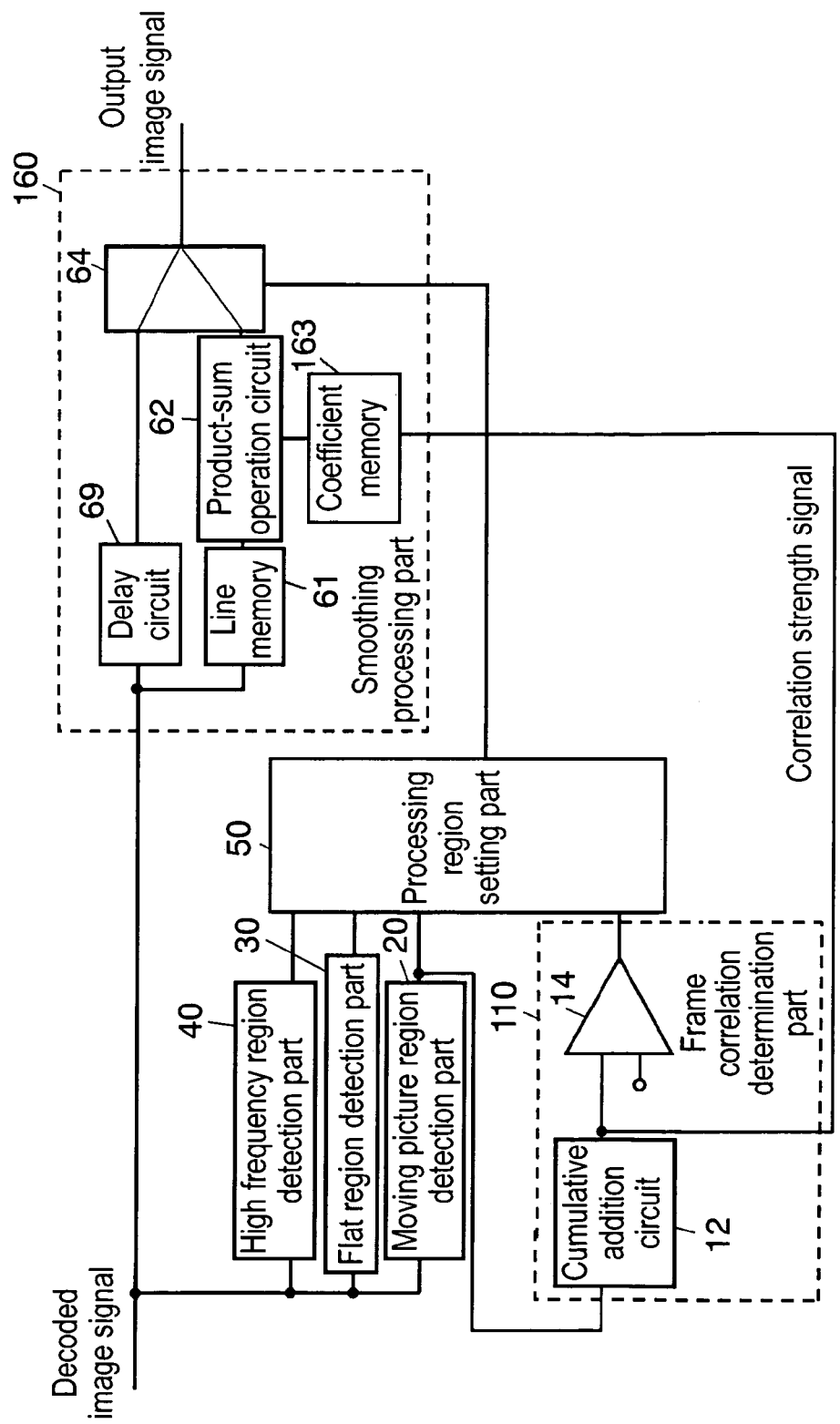
FIG. 6 is a circuit block diagram showing a block noise reduction device in accordance with a second exemplary embodiment of the present invention.

FIG. 6 is a circuit block diagram showing a block noise reduction device in accordance with the second exemplary embodiment of the present invention. In FIG. 6, the same reference numerals are given to the same component elements as those in the first exemplary embodiment and the description therefor is omitted herein. In the second exemplary embodiment, an output from cumulative addition circuit 12 of frame correlation determination part 110 is taken out as a correlation strength signal, and based on the correlation strength signal, two-dimensional low-pass filter coefficient matrices of coefficient memory 163 of smoothing processing part 160 are switched. FIGS. 7A and 7B are views showing coefficient matrices of the two-dimensional filter processing of the block noise reduction device in accordance with the second exemplary embodiment of the present invention, respectively. FIG. 7A shows a first coefficient matrix for performing weak low-pass filter processing, and FIG. 7B shows a second coefficient matrix for performing strong low-pass filter processing, respectively. In accordance with the size of the correlation strength signal, the first coefficient matrix and the second coefficient matrix are switched from each other. When the correlation strength signal is small, the correlation between frames is high, showing that the probability that strong block noise occur is low. Therefore, in this case, weak low-pass filter processing is performed, which has a small smoothing effect but may not lower the resolution. On the other hand, when the correlation strength signal is large, the correlation between frames is low, showing that the probability that strong block noise occur is high. Therefore, in this case, strong low-pass filter processing having a large block noise reduction effect is performed. Therefore, when the correlation strength signal is small, low-pass filter processing is performed by using the first coefficient matrix, and when the correlation strength signal is large, low-pass filter processing is performed by using the second coefficient matrix.

In this way, by controlling the smoothing degree based on a correlation amount signal, block noise reduction processing corresponding to a displayed image can be performed.

The second exemplary embodiment described smoothing processing using low-pass filter processing by the use of the two coefficient matrices shown in FIGS. 7A and 7B. The present invention is not limited to this, filter processing having other coefficient matrices may be employed. Furthermore, two or more coefficient matrices may be switched based on the correlation strength. Furthermore, the smoothing processing is not limited to the above-mentioned low-pass filter processing, and other smoothing processing technologies such as a median filter may be employed.

Third Exemplary Embodiment

A block noise reduction device in a third exemplary embodiment of the present invention is the same as that in the first exemplary embodiment in that smoothing processing to image signals is performed in a region in frames in which a correlation between frames is low and which is a flat region and not a high frequency region in the image signals, or a region which is a moving picture region, is a flat region and is not a high frequency region. The block noise reduction device of the third exemplary embodiment is different from that of the first exemplary embodiment in that in the smoothing processing part, the image signal to which smoothing processing is not performed and the image signal to which smoothing processing was performed are switched smoothly not by switching the two image signals alternatively but by mixing the two signals at an arbitrary ratio. In this way, by smoothly switching between the image signal to which smoothing processing is not performed and the image signal to which smoothing processing was performed, it is possible to prevent unnatural noise from occurring in a boundary portion between the two image signals.

Figure 8:
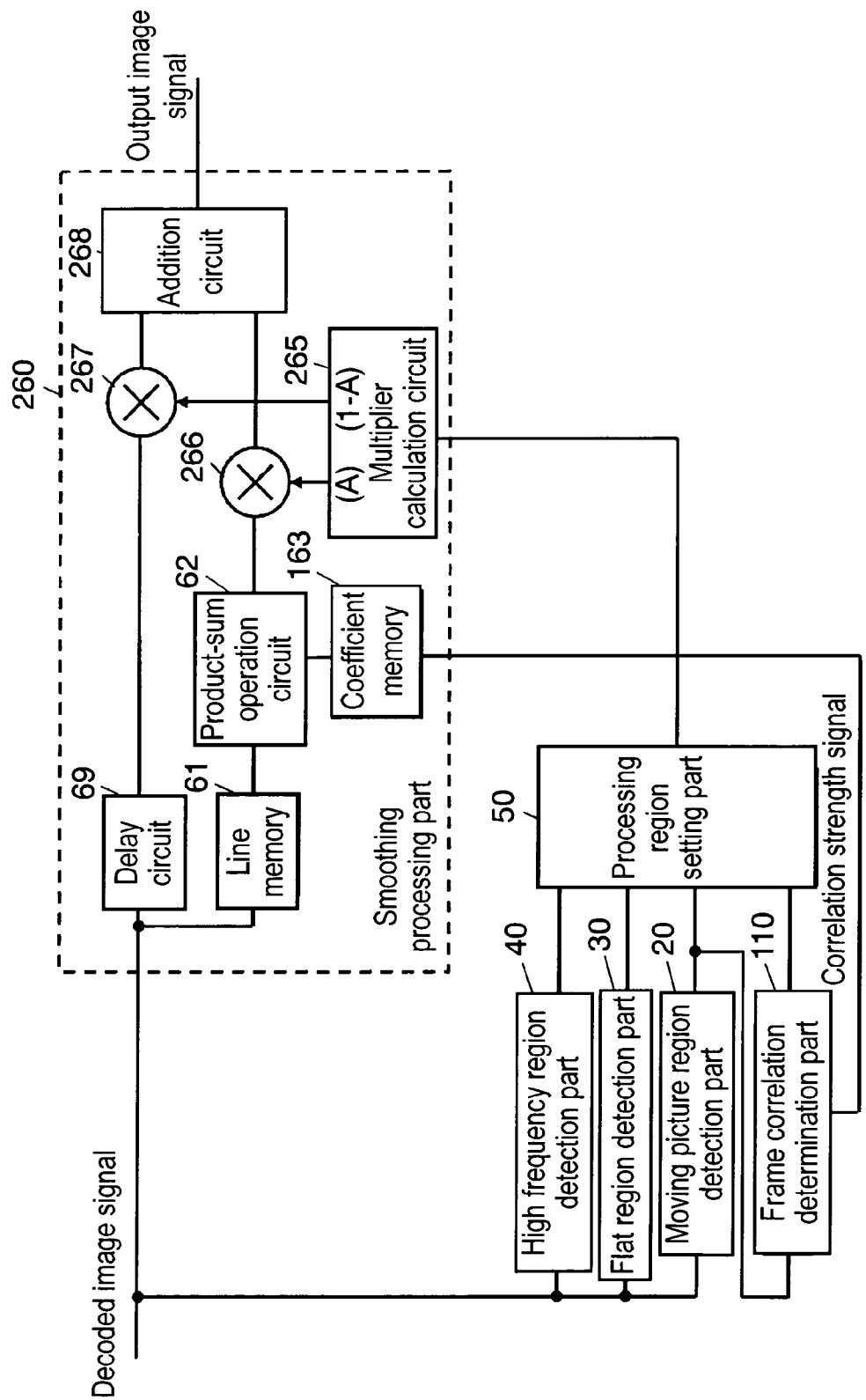
FIG. 8 is a circuit block diagram showing a block noise reduction device in accordance with a third exemplary embodiment of the present invention.

FIG. 8 is a circuit block diagram showing a block noise reduction device in accordance with the third exemplary embodiment of the present invention. In FIG. 8, the same reference numerals are given to the same component elements as those in the first and second exemplary embodiments and the description therefor is omitted herein. Smoothing processing part 260 in the third exemplary embodiment includes multiplication circuit 266 for multiplying an image signal that was subjected to smoothing processing by multiplier A, multiplication circuit 267 for multiplying an image signal that is not subjected to smoothing processing by multiplier (1−A), addition circuit 268 for adding the outputs from two multiplication circuits 266 and 267, and multiplier calculation circuit 265 for calculating multiplier A and multiplier (1−A) based on the processing region signal. Herein, multiplier A satisfies 0≦A≦1. Therefore, when A=0 is satisfied, the image signal output from addition circuit 268 is the output from delay circuit 69, that is, an image signal that is not subjected to smoothing processing. As the value of A becomes larger, the rate of the image signal that is not subjected to smoothing processing is decreased and the rate of the image signal that was subjected to smoothing processing is increased. When A=1 is satisfied, the image signal that was subjected to smoothing processing is output from addition circuit 268.

Figure 9:
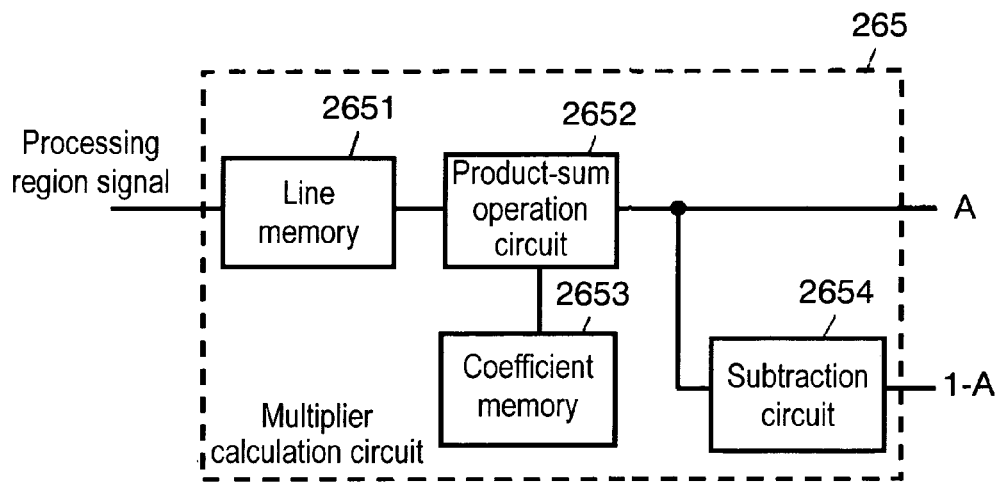
FIG. 9 is a circuit block diagram showing a multiplier calculation circuit of the block noise reduction device in accordance with the third exemplary embodiment of the present invention.
Figure 10A:
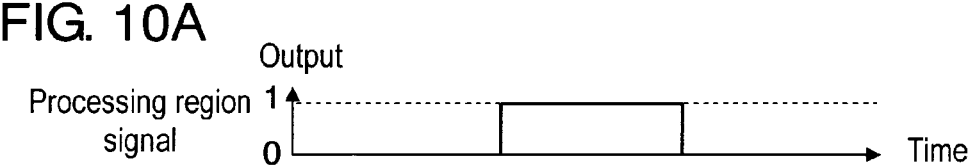
FIG. 10A is a view showing a processing region signal to illustrate an operation of the multiplier calculation circuit of the block noise reduction device in accordance with the third exemplary embodiment of the present invention.
Figure 10B:
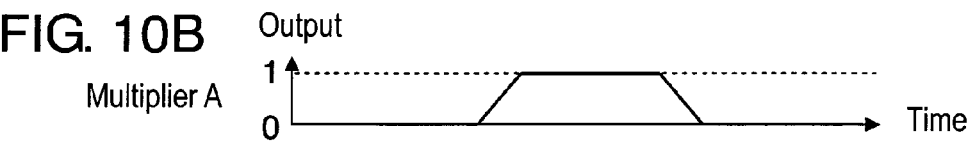
FIG. 10B is a view showing calculated multiplier A to illustrate an operation of the multiplier calculation circuit of the block noise reduction device in accordance with the third exemplary embodiment of the present invention.
Figure 10C:
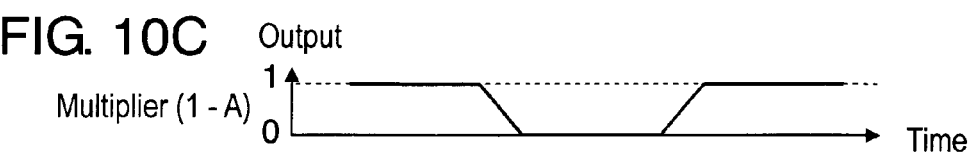
FIG. 10C is a view showing calculated multiplier (1−A) to illustrate an operation of the multiplier calculation circuit of the block noise reduction device in accordance with the third exemplary embodiment of the present invention.

FIG. 9 is a circuit block diagram showing multiplier calculation circuit 265 of the block noise reduction device in accordance with the third exemplary embodiment of the present invention, and FIGS. 10A, 10B and 10C are views to illustrate the operation thereof, respectively. FIG. 10A is a view showing a processing region signal input to multiplier calculation circuit 265. FIGS. 10B and 10C are views respectively showing calculated multiplier A and multiplier (1−A) that are the outputs from multiplier calculation circuit 265. Multiplier calculation circuit 265 performs smoothing processing such as two-dimensional low-pass filter processing to a processing region signal that is binary signal "0" or "1", thereby calculating multiplier A and calculating multiplier (1−A) by subtracting multiplier A from "1." Therefore, as shown in FIG. 9, multiplier calculation circuit 265 includes line memory 2651 for taking an image signal out of a smoothing processing matrix, coefficient memory 2653 storing a coefficient matrix of a two-dimensional low-pass filter, product-sum operation circuit 2652 for multiplying an image signal at each pixel position in the matrix by the coefficient so as to calculate the total sum, and subtraction circuit 2654 for calculating multiplier (1−A). As the coefficient matrix stored in coefficient memory 2653, for example, the coefficient matrix shown in FIG. 5B may be used. Then, for example, when the processing region signal shown in FIG. 10A is input, multiplier A and multiplier (1−A) are signals that smoothly change between "0" and "1" as shown in FIGS. 10B and 10C. The thus calculated multiplier A and multiplier (1−A) are used, and the image signal that was subjected to smoothing processing and the image signal that is not subjected to smoothing processing are switched while they are mixed, thereby these two image signals linked to each other smoothly. Therefore, unnatural noise may not occur in a boundary portion between the two image signals.

As mentioned above, the present invention can provide a block noise reduction device capable of reducing block noise without impairing the resolution of an image when compressed and coded image signals are decoded.

INDUSTRIAL APPLICABILITY

The present invention can provide a block noise reduction device capable of reducing block noise without impairing the resolution of an image when compressed and coded image signals are decoded. Therefore, the block noise reduction device of the present invention is useful as a block noise reduction device for removing block noise from a decoded image signal obtained by decoding a compressed and coded image signal and an image display device and the like using the block noise reduction device.

The invention claimed is:
1. A block noise reduction device for reducing block noise from a decoded image signal obtained by decoding a compressed and coded image signal, comprising:
 a moving picture region detection part for detecting a moving picture region within a frame of the decoded image signal;

a frame correlation determination part for determining a level of correlation between the frame of the decoded image signal and a previous frame of the decoded image signal;

a flat region detection part for detecting an image region in which a difference in brightness between neighboring pixels is small as a flat region from the decoded image signal;

a high-frequency region detection part for detecting an image region including a high spatial frequency component as a high-frequency region from the decoded image signal;

a smoothing processing part for performing smoothing processing to the decoded image signal corresponding to a predetermined region; and a processing region setting part for specifying an image region in which the smoothing processing part is to perform smoothing processing to the decoded image signal, wherein the processing region setting part sets at least a region in frames in which a correlation between frames is low or is a moving picture region, and which is a flat region and not a high frequency region in the decoded image signal, as a processing region, and the smoothing processing part does not perform processing in another region that is not the processing region, wherein the smoothing processing part performs strong low-pass filter processing having a large block noise reduction effect as the correlation of the decoded image signals between frames is lower.

2. A block noise reduction device for reducing block noise from a decoded image signal obtained by decoding a compressed and coded image signal, comprising:

a moving picture region detection part for detecting a moving picture region within a frame of the decoded image signal;

a frame correlation determination part for determining a level of correlation between the frame of the decoded image signal and a previous frame of the decoded image signal;

a flat region detection part for detecting an image region in which a difference in brightness between neighboring pixels is small as a flat region from the decoded image signal;

a high-frequency region detection part for detecting an image region including a high spatial frequency component as a high-frequency region from the decoded image signal;

a smoothing processing part for performing smoothing processing to the decoded image signal corresponding to a predetermined region; and a processing region setting part for specifying an image region in which the smoothing processing part is to perform smoothing processing to the decoded image signal, wherein the processing region setting part sets at least a region in frames in which a correlation between frames is low or is a moving picture region, and which is a flat region and not a high frequency region in the decoded image signal, as a processing region, and the smoothing processing part does not perform processing in another region that is not the processing region, wherein the smoothing processing part performs smoothing processing to the decoded image signal and provides a transition region between the processing region and a region other than the processing region; and in the transition region, the decoded image signal that was subjected to the smoothing processing and the decoded image signal that is not subjected to the smoothing processing are switched while they are mixed, thereby these two image signals linked to each other smoothly.

3. An image display device using a block noise reduction device for reducing block noise from a decoded image signal obtained by decoding a compressed and coded image signal, comprising:

wherein the block noise reduction device comprising:

a moving picture region detection part for detecting a moving picture region within a frame of the decoded image signal;

a frame correlation determination part for determining a level of correlation between the frame of the decoded image signal and a previous frame of the decoded signal;

a flat region detection part for detecting an image region in which a difference in brightness between neighboring pixels is small as a flat region from the decoded image signal;

a high-frequency region detection part for detecting an image region including a high spatial frequency component as a high-frequency region from the decoded image signal;

a smoothing processing part for performing smoothing processing to the decoded image signal corresponding to a predetermined region; and a processing region setting part for specifying an image region in which the smoothing processing part is to perform smoothing processing to the decoded image signal, wherein the processing region setting part sets at least a region in frames in which a correlation between frames is low or is a moving picture region, and which is a flat region and not a high frequency region in the decoded image signal, as a processing region, and the smoothing processing part does not perform processing in another region that is not the processing region, wherein the smoothing processing part performs strong low-pass filter processing having a large block noise reduction effect as the correlation of the decoded image signals between frames is lower.

4. An image display device using a block noise reduction device for reducing block noise from a decoded image signal obtained by decoding a compressed and coded image signal, comprising:

wherein the block noise reduction device comprising:

a moving picture region detection part for detecting a moving picture region within a frame of the decoded image signal;

a frame correlation determination part for determining a level of correlation between the frame of the decoded image signal and a previous frame of the decoded signal;

a flat region detection part for detecting an image region in which a difference in brightness between neighboring pixels is small as a flat region from the decoded image signal;

a high-frequency region detection part for detecting an image region including a high spatial frequency component as a high-frequency region from the decoded image signal;

a smoothing processing part for performing smoothing processing to the decoded image signal corresponding to a predetermined region; and a processing region setting part for specifying an image region in which the smoothing processing part is to perform smoothing processing to the decoded image signal, wherein the processing region setting part sets at least a region in frames in which a correlation between frames is low or is a moving picture region, and which is a flat region and not a high frequency region in the decoded image signal, as a processing region, and the smoothing processing part does not perform processing in another region that is not the processing region, wherein the smoothing processing part performs smoothing processing to the decoded image signal and provides a transition region between the processing region and a region other than the processing region; and in the transition region, the decoded image signal that was subjected to the smoothing processing and the decoded image signal that is not subjected to the smoothing processing are switched while they are mixed, thereby these two image signals linked to each other smoothly.

* * * * *

UNITED STATES PATENT AND TRADEMARK OFFICE
CERTIFICATE OF CORRECTION

| | |
|---|---|
| PATENT NO. | : 8,300,707 B2 |
| APPLICATION NO. | : 10/571645 |
| DATED | : October 30, 2012 |
| INVENTOR(S) | : Kazuki Sawa |

It is certified that error appears in the above-identified patent and that said Letters Patent is hereby corrected as shown below:

At (56), FOREIGN PATENT DOCUMENTS, page 2, please delete duplicate reference "JP 8-84342    3/1996".

At (56), FOREIGN PATENT DOCUMENTS, page 2, please delete duplicate reference "JP 08084342    3/1996".

Signed and Sealed this
Twenty-sixth Day of March, 2013

Teresa Stanek Rea
*Acting Director of the United States Patent and Trademark Office*